United States Patent [19]
Mehansho et al.

[11] Patent Number: 5,707,670
[45] Date of Patent: Jan. 13, 1998

[54] USE OF BILAYER FORMING EMULSIFIERS IN NUTRITIONAL COMPOSITIONS COMPRISING DIVALENT MINERAL SALTS TO MINIMIZE OFF-TASTES AND INTERACTIONS WITH OTHER DIETARY COMPONENTS

[75] Inventors: Haile Mehansho, Fairfield; Renee Irvine Mellican, Woodlawn; Toan Trinh, Maineville, all of Ohio

[73] Assignee: The Procter & Gamble Company, Cincinnati, Ohio

[21] Appl. No.: 705,458

[22] Filed: Aug. 29, 1996

[51] Int. Cl.$^6$ ............................................. A23L 1/29
[52] U.S. Cl. .......................... 426/73; 426/74; 426/94; 426/97; 426/99; 426/103; 426/593; 426/631
[58] Field of Search .......................... 426/74, 94, 97, 426/99, 103, 631, 593, 73

[56] References Cited

U.S. PATENT DOCUMENTS

| | | | |
|---|---|---|---|
| 3,734,742 | 5/1973 | Morse et al. | 99/28 |
| 3,758,540 | 9/1973 | Marteil | 260/439 R |
| 3,803,292 | 4/1974 | Bell | 423/274 |
| 3,806,613 | 4/1974 | Carroll et al. | 426/97 |
| 3,899,598 | 8/1975 | Fisher et al. | 426/73 |
| 3,958,017 | 5/1976 | Morse et al. | 426/72 |
| 3,992,556 | 11/1976 | Kovacs et al. | 426/97 |
| 4,020,158 | 4/1977 | Ashmead et al. | 424/177 |
| 4,172,072 | 10/1979 | Ashmead | 260/115 |
| 4,183,947 | 1/1980 | Cockerill | 424/295 |
| 4,201,793 | 5/1980 | Ashmead | 426/92 |
| 4,208,405 | 6/1980 | Found | 424/177 |
| 4,216,144 | 8/1980 | Ashmead | 260/115 |
| 4,599,152 | 7/1986 | Ashmead | 204/72 |
| 4,830,716 | 5/1989 | Ashmead | 204/72 |
| 4,863,898 | 9/1989 | Ashmead et al. | 514/6 |
| 4,992,282 | 2/1991 | Mehansho et al. | 426/72 |
| 5,002,779 | 3/1991 | Mehansho et al. | 426/72 |
| 5,087,442 | 2/1992 | Takaichi et al. | 424/44 |
| 5,110,965 | 5/1992 | Thunberg et al. | 556/148 |
| 5,278,329 | 1/1994 | Anderson | 556/50 |
| 5,389,395 | 2/1995 | Joseph et al. | 426/72 |

OTHER PUBLICATIONS

Douglas, Jr. et al.; Color, Flavor, and Iron bioavailability in Iron–fortified chocolate milk; *Journal of Dairy Science*; pp. 1785–1793; vol. 64, No. 9, 1981.

MacPhail et al.; Fortification of the diet as a strategy for preventing iron deficiency, *Acta Paediatr Scand Suppl.*; 361: pp. 114–124; 1989.

Hurrell et al.; Iron fortification of infant cereals: a proposal for the use of ferrous fumarate or ferrous succinate; *Am. J. Clin. Nutr.*; 1989; 49; pp. 1274–1282.

Hurrell et al.; Ferrous fumarate fortification of a chocolate drink powder; *British Journal of Nutrition*; 1991; 65: pp. 271–283.

Hurrell et al.; Strategies for iron fortification of foods; *Trends in Foods Science & Tech.*; Sep. 1990; pp. 56–61.

Windisch et al.; Influencing the bioavailability of iron through substances contained in foods; *AID–Verbraucherdienst*; vol. 29, No. 10; 1989; pp. 201–207.

Brodan et al.; Influence of fructose on iron absorption from the digestive system of healthy subjects; *Nutri. Dieta 9*; pp. 263–270; 1967.

Matzkies et al.; On the improvement of the absorption of divalent iron using an iron–enriched, vitamin–C–containing fruit juice; *Ernährungs–Umschau*; vol. 31, No. 11; pp. 373–374; 1984.

*Primary Examiner*—Helen Pratt
*Attorney, Agent, or Firm*—Eric W. Guttag

[57] ABSTRACT

Nutritional iron compositions comprising bioavailable sources of iron selected from ferrous fumarate and ferrous succinate where the iron source is preferably spread on the surface of a lecithin coated edible carrier such as sucrose. These nutritional iron compositions are particularly useful in food and beverage products such as chocolate flavored edible mixes, especially chocolate flavored beverages, that are additionally fortified with other minerals and vitamins, especially multi-mineral and vitamin combinations involving, iodine, vitamin A, vitamin C, riboflavin, and folic acid to avoid developing an undesirable color, off-flavor, astringency, particularly when the edible and/or beverage mix is reconstituted with water or milk.

10 Claims, No Drawings

USE OF BILAYER FORMING EMULSIFIERS IN NUTRITIONAL COMPOSITIONS COMPRISING DIVALENT MINERAL SALTS TO MINIMIZE OFF-TASTES AND INTERACTIONS WITH OTHER DIETARY COMPONENTS

TECHNICAL FIELD

This application relates to the delivery of divalent mineral salts, in particular highly bioavailable ferrous salts such as ferrous fumarate and ferrous succinate, from edible mixes or powders, in particular chocolate-flavored beverage mixes or powders. This application especially relates to the delivery of these bioavailable ferrous salts in combination with other minerals and vitamins, in particular, iodine, vitamin A, vitamin C and B complex vitamins such as vitamin B1, vitamin B6 and vitamin B12.

BACKGROUND OF THE INVENTION

Iron deficiency continues to be a common nutritional problem at the present time. Iron deficiency is a major problem in the developing world and affects almost all segments of the population. It is particularly severe in infants and childbearing women. See MacPhail and Bothwell, "Fortification of the Diet as a Strategy for Preventing Iron Deficiency," *Acta Paediatric Scand. Supplement*, 361: 114 (1989).

Even in industrialized countries, one segment of the population that remains highly vulnerable to iron deficiency is preschool and school-aged children because their requirements for iron for growth often exceed the dietary supply of iron. Iron requirements for adolescents can be increased further by strenuous athletic programs and, in ram, their athletic performance can be impaired by the development of iron deficiency. See Hurrell, "Ferrous Fumarate Fortification Of A Chocolate Drink Powder," *British Journal of Nutrition*, 65: 271 (1991)

Several strategies have been proposed to reduce the prevalence of iron deficiency in school-age children. Although iron supplements are effective, logistics and compliance are major problems. In addition, the prevalence of iron deficiency is not usually high enough to justify the use of medicinal iron. The iron intake of children can be increased by fortifying a dietary staple such as wheat products or by fortifying a widely consumed food such as sugar, but this can be too costly for developing countries. Hurrell, supra, suggests that the most cost-effective approach to increase iron intake in children is fortification of a specialty food item that is used selectively in this age group. This food item should be appealing to children and ideally should provide other nutritional benefits.

One such item proposed by Hurrell, supra, is chocolate-flavored milk beverages. The consumption of this product is largely limited to school-age children and would not be consumed by adult men who seldom require additional iron. In addition, chocolate-flavored milk would also increase the intake of other minerals and vitamins such as zinc and calcium that are desirable for children.

As noted by Hurrell, supra, there are well-recognized problems associated with fortifying foods and beverages with iron, including chocolate milk drinks. This is particularly true of highly bioavailable iron sources (e.g., ferrous sulfate, ferrous gluconate, etc.) that are commonly used to fortify foods. These irons sources tend to discolor foodstuffs (e.g., by reacting with food components such as anthocyanins, flavanoids and tannins), or are organoleptically unsuitable (e.g., impart a metallic aftertaste). Fortifying foods and, especially, beverages, that contain fats with these iron sources can be very difficult as these materials tend to interact, with the fats typically being oxidized to produce off-flavors. This interaction not only affects the organoleptic and aesthetic properties of the foods and beverages, but also undesirably affects the nutritional bioavailability of these materials. However, the use of inert iron sources (reduced iron, ferric pyrophosphate, etc.) that cause little or no organoleptic problems are poorly absorbed from the gut. The challenge is to fortify foods with highly bioavailable iron sources without adversely affecting the color or taste of the product.

Hurrell, supra, proposes fortifying chocolate drink powders with ferrous fumarate as the iron source. When these ferrous fumarate fortified chocolate drink powders were reconstituted with cold or hot (80° C.) water or milk, the reconstituted beverage was judged acceptable as to color and flavor. However, when these ferrous fumarate fortified chocolate drink powders were reconstituted with boiling water or milk, Hurrell, supra, says the reconstituted beverage "changed color from red/brown to an unacceptable gray." See Id. at page 275. Also, ferrous fumarate imparts a metallic aftertaste that can be undesirable.

Besides iron, there are other important micronutrients that these chocolate drinks could be fortified with. One such micronutrient is iodine. Iodine deficiency is major risk factor for both physical and mental development in a significant number of people. Goiter is the most common manifestation of iodine deficiency. In childhood, iodine deficiency can cause mental retardation, neurological complications such as speech and hearing defects, squint, paralysis, and other physical disorders. While the more severe effects of iodine deficiency are not reversible, they are preventable by appropriate fortification of foods and beverages. See Theme Paper No. 6, "Preventing Specific Micronutrient Deficiencies," INTERNATIONAL CONFERENCE ON NUTRITION.

Another key micronutrient is vitamin A. Vitamin A deficiency is the most common cause of preventable childhood blindness. As a result of insufficient dietary intake and absorption of vitamin A, a significant number of pre-school age children suffer sever forms of eye damage. Vitamin A deficiency can also contribute to decreased physical growth and impaired resistance to infection and lead to increased mortality in children. See Theme Paper No. 6, "Preventing Specific Micronutrient Deficiencies," INTERNATIONAL CONFERENCE ON NUTRITION. Deficiencies in other minerals and vitamins such as vitamin C, B complex vitamins (e.g. thiamine, B6, B12), vitamin D, riboflavin, folic acid, pantothenic acid, vitamin D, vitamin E, zinc, etc., can also cause serious health problems.

Iron fortification of these chocolate drink powders, as well as other foods and beverages, becomes even more of a problem when the drink powder is further fortified with these other minerals and vitamins, especially mineral and vitamin combinations involving, iodine, vitamin A, vitamin C, riboflavin, and folic acid. Even the inclusion of vitamin C alone in chocolate drink powders fortified with ferrous fumarate or ferrous succinate, another highly bioavailable iron source, can cause the development of this undesirable gray color when the powder is reconstituted with aqueous liquids such as water or milk. Iron is a known catalyst that can cause oxidation and decomposition of various vitamins, including vitamins A, thiamine, B6, B12 and vitamin C to name a few. See "Stability Characteristics of Vitamins in Processed Foods," *Food Tech.*, (January 1976), pages 48–54. Iron sources, such as ferrous fumarate and ferrous sulfate, are also known to enhance the sublimation of iodine, thus decreasing the amount of this mineral in the beverage powder.

Accordingly, it would be desirable to provide chocolate drink powders fortified with highly bioavailable iron sources such as ferrous fumarate and ferrous succinate that do not develop an undesirable gray color and metallic aftertaste when reconstituted with aqueous liquids such as water or milk, even when the water or milk has been heated to the boiling point. It would also be desirable to be able to additionally fortify these powders with other key minerals and vitamins without undesirable interactions with the bioavailable iron source.

DISCLOSURE OF THE INVENTION

The present invention relates to nutritional foods, beverages, and other edible products, especially chocolate-flavored beverage edible mixes, that are fortified with nutritional compositions comprising divalent mineral salts, especially highly bioavailable ferrous salts. These nutritional compositions comprise:

(a) an edible carrier comprising:
  (1) an effective amount of an emulsifier capable of forming a bilayer structure;
  (2) optionally an edible substrate;
  (3) optionally an effective amount of a bilayer stabilizer; and
(b) a nutritionally effective amount of a divalent mineral salt on the carrier and having the formula:

MA wherein M is a divalent metal selected from iron, calcium, zinc, copper, magnesium, manganese and mixtures thereof, and wherein A is a compatible dicarboxylate anion having no other polar functional groups.

These nutritional compositions, especially those comprising highly bioavailable ferrous salts, are particularly useful in combination with other minerals and vitamins, especially multi-mineral and vitamin combinations involving iodine, vitamin A, vitamin C, riboflavin, and folic acid. Chocolate flavored edible mixes, especially chocolate-flavored beverage mixes, fortified with iron compositions according to the present invention (with or without other minerals and vitamins) further comprise:

(d) a flavor enhancing amount of cocoa;
(e) from 0% to about 25% milk solids;
(f) an effective amount of a sweetener.

The present invention further relates to method for preparing these preferred nutritional iron compositions, especially in combination with other minerals and vitamins. This method comprises the steps of:

(a) coating the edible substrate with an effective amount of an emulsifier capable of forming a bilayer structure (with or without the bilayer stabilizer) to provide an edible carrier;
(b) spreading a nutritionally effective amount of a ferrous salt of a dicarboxylic acid having no other polar functional group on the surface of the edible carrier to provide a nutritional iron composition; and
(c) combining the nutritional iron composition with other ingredients that can include other minerals and vitamins such as iodine, vitamin A, vitamin C, riboflavin, and folic acid, and/or other food or beverage components such as cocoa, milk solids, sweetener, etc.:

The spreading of the ferrous salt (i.e., ferrous fumarate and ferrous fumarate) on the surface of the edible carrier comprising the emulsifier (preferably coated on the edible substrate) to form the nutritional compositions of the present invention solves various problems in fortifying foods, beverages and other edible products, especially chocolate-flavored edible mixes, and in particular chocolate-flavored beverage mixes, with these highly bioavailable iron sources. Food and beverage products containing these nutritional compositions where the ferrous salt or other divalent mineral salt is on the emulsifier coated carrier do not have a metallic aftertaste or other off-tastes. Edible chocolate-flavored mixes, especially chocolate-flavored beverage mixes, containing these nutritional iron compositions can also be fortified with other minerals and vitamins, especially iodine, vitamin and vitamin C, without developing an undesirable gray color when the edible mix is reconstituted with aqueous liquids such as water or milk, even when the water or milk has been heated to the boiling point. Indeed, the use of the emulsifier coated carrier in the nutritional iron compositions of the present invention has been found to improve the stability of vitamins and retention of iodine within the edible mix, (i.e., the iodine does not readily sublimate away) by preventing the iron/copper catalyzed degradation.

DETAILED DESCRIPTION OF THE INVENTION

A. Definitions

As used herein, the term "chocolate-flavored edible mix" means a chocolate-flavored food or beverage mix that, alone or in combination with other edible ingredients, can be reconstituted with an aqueous liquid or diluent, i.e., water, milk or other aqueous medium, to provide a chocolate-flavored consumable product. Chocolate-flavored edible mixes according to the present invention can be used in the preparation of various chocolate-flavored products, including cereal products, baby foods or formulas, puddings, ice cream, dips, syrups, pie and other dessert fillings, frostings, cake, cookie mixes and brownie mixes, and beverages. Particularly preferred chocolate-flavored edible mixes according to the present invention are chocolate-flavored beverage mixes that can be reconstituted to provide chocolate-flavored beverages.

As used herein, the term "total water" means the total water present in the dry mix that includes the water present in the various edible ingredients such as cocoa, minerals (e.g., iron), emulsifiers, sugars, milk solids, flour, vitamins, etc.

As used herein, the term "total fat" means the total fat present in the dry mix that includes the fat present in emulsifiers, minerals, vitamin preparations, sweeteners, cocoa, milk solids and other dry ingredients.

As used herein, the term "reconstituted product or beverage" means the product or beverage that is prepared by mixing the dry edible mix of the present invention with an aqueous liquid or diluent, i.e., water, milk or other aqueous medium, e.g., coffee, tea or fruit juice. The dry mix can be diluted typically at a ratio of from about 0.1:10 to about 1:2 of dry mix to liquid or diluent, e.g., water or milk.

As used herein, the terms "ready-to-serve" and "ready-to-eat" refers to food or beverage products that is in a consumable or drinkable form.

As used herein, the term "mixing in a dry state" means that dry or liquid ingredients are blended without adding any water, steam or other water containing solvent. The mixing should make as homogeneous a blend as possible.

As used herein, the term "comprising" means various components or steps can be conjointly employed in the nutritional iron compositions of the present invention, the methods for making these iron compositions, the edible mixes containing these iron compositions, and methods for making these edible mixes. Accordingly, the terms "consisting essentially of" and "consisting of" are embodied in the term comprising.

All weights, parts and percentages used herein are based on weight unless otherwise specified.

B. Nutritional Compositions

1. Divalent Mineral Salts

An important component of the nutritional compositions of the present invention is a divalent mineral salt having the formula:

$$MA$$

wherein M is a divalent metal selected from iron, calcium, zinc, copper, magnesium, manganese and mixtures thereof, and wherein A is a compatible dicarboxylate anion having no other polar functional groups (e.g., no hydroxy groups). The particularly preferred divalent metal for use in the present invention is iron. The particularly preferred carboxylate anions for use in the present invention are succinate, malonate, glutarate, adipate, fumarate and maleate. Representative divalent mineral salts that can be used in the present invention include ferrous succinate, ferrous furmarate, calcium succinate, calcium fumarate, zinc succinate, zinc fumarate, cuprous succinate, cuprous fumarate, magnesium succinate, magnesium fumarate, manganese succinate, manganese fumarate, as well as mixtures of these divalent mineral salts. The present invention is particularly useful with nutritional compositions that comprise the highly bioavailable ferrous salts ferrous fumarate, ferrous succinate, as well as mixtures of these ferrous salts.

The divalent mineral salt is included in the nutritional compositions of the present invention in a "nutritionally effective" amount. By "nutritionally effective amount" is meant that the divalent mineral salt is included an amount that provides a measurable, nourishing amount of the mineral in a single serving. This is typically at least about 3%, more typically at least about 10% of the Recommended Daily Allowance (RDA) of the daily intake of the mineral and, preferably, at least about 25% of the RDA. The RDA for the various minerals are as defined in The United States of America (see Recommended Daily Dietary Allowance-Food and Nutrition Board, National Academy of Sciences-National Research Council).

For the nutritional compositions of the present invention, the nutritionally effective amount for divalent mineral salt will generally comprise more than about 3% of the RDA and preferably from about 10 to about 100% of the RDA, and most preferably from about 10 to about 30% of the RDA, per unit portion of the consumable product. For the preferred ferrous salts, the RDA for iron ranges from 10 mg per 6 kg to 18 mg per 54–58 kg for females, depending somewhat on age. Typically, foods and beverages are supplemented with from about 10 to about 45% RDA of iron (based per serving) to account for iron that is available from other dietary sources, assuming a reasonably balanced diet. (For the other divalent metals, corresponding 100% RDA values are 1000 mg. for calcium, 15 mg. for zinc, 2 mg. for copper, 400 mg. for magnesium, and 2 mg. for manganese.)

2. Emulsifier-Containing Edible Carrier

Another important component of the nutritional iron compositions of the present invention is an edible carrier. This edible carrier comprises an emulsifier capable of forming a bilayer structure, i.e., an emulsifier that can form a vesicle or liposome. Inclusion of these emulsifiers in the edible carrier: (a) prevents or minimizes the development of undesirable color that can be caused by ferrous salts such as ferrous fumarate or ferrous succinate in foods and beverages, especially chocolate flavored edible mixes, that contain components such as anthocyanins, flavanoids, tannins, and the like; (b) minimizes the characteristic off-taste effects imparted by the various divalent mineral salts, including the metallic taste imparted by the ferrous salts; (c) prevents or minimizes the undesired oxidation of any vitamins/fats/flavors that are present; and (d) improves the retention of iodine within the edible mix. Suitable emulsifiers include phospholipids such as phosphatidyl choline, phosphatidylethanolamine, phosphatidylinositol, and mixtures thereof, and in particular compositions containing one or more of these phospholipids such as the lecithins, cephalins and plasmalogens, glycoplipids such as cerbroside and glycolipid-containing compositions, sorbitan esters of long chain saturated ($C_{16}$–$C_{18}$) fatty acids, (e.g., SPAN 40), lactic acid esters of long chain saturated ($C_{16}$–$C_{18}$) fatty acid monoglycerides (e.g., Lactem), diacetyl tartaric acid esters of long chain saturated ($C_{16}$–$C_{18}$) fatty acid monoglycerides (e.g., Panodan FDPK), bile salts and bile acids, especially the chenodeoxycholic acid derivatives and secondary deoxycholic acid derivatives such as glycochenodeoxycholic acid and taurochendeoxycholic acid, as well as mixtures of these emulsifiers. Lecithin is particularly preferred as the emulsifier for use in the nutritional compositions of the present invention.

The emulsifier is preferably coated on an edible substrate to provide the edible carrier. Suitable edible substrates include any of a variety of conventional solid, or plastic materials, typically selected from carbohydrates, proteins, fats and mixtures thereof that are suitable for use in edible products, so long as the substrate does not impart any undesirable off-flavors. These edible substrates can include starches such as corn starch and potato starch, cellulose and its derivatives, such as sodium carboxymethyl cellulose, ethyl cellulose, and cellulose acetate, malt, gelatin, sugars and sugar alcohols, milk solids derived from whole milk, skim milk, condensed milk, dried milk powder, dairy and non dairy creamers, synthetic and imitation dairy products, various fats, including hydrogenated soybean oil, hydrogenated canola oil, hydrogenated coconut oil, as well as other hydrogenated vegetable oils, or combinations of such oils, as well as mixtures of these substrates. Preferred edible substrates for use in the present invention are sugars, and especially combinations of sugar with a creamer and/or fat. It has been found that the inclusion creamer and/or fat enhances the benefit provided by the emulsifier in preventing off-color development that can be caused by the ferrous salts such as ferrous fumarate or ferrous succinate.

The edible carrier can optionally comprise an effective amount of a bilayer stabilizer. It has been found that the inclusion of bilayer stabilizers in the edible carrier can enhance the benefit provided by the emulsifier in preventing off-color development that can be caused by the divalent mineral salts such as ferrous fumarate and ferrous succinate. Indeed, in the case of certain emulsifiers such as diacetyl tartaric acid esters of long chain saturated ($C_{16}$–$C_{18}$) fatty acid monoglycerides (e.g. Panodan FDPK), inclusion of the bilayer stabilizer can be extremely important in preventing off color development. These bilayer stabilizers include animal and plant sterols (e.g. cholesterol, stigmastanol), triglycerides (e.g. triolein, coconut oil), monoglycerides/ diglycerides, phenolics/flavanoids (e.g., the catechins derived from green tea extract), sucrose esters of long chain (e.g., saturated $C_{16}$–$C_{18}$) fatty acids, as well as mixtures of these stabilizers. Certain edible substrates such as dairy and non dairy creamers, various fats and oils, as well other components present in the food or beverage product can inherently provide these bilayer stabilizers. These stabilizers can be mixed with the emulsifier prior to or after the addition of the divalent mineral salts, preferably in a ratio of emulsifier to stabilizer ratio of from about 1:200 to about 25:1.

The emulsifier is typically heated until it melts to facilitate the spreading thereof on the edible substrate. The ratio of emulsifier to edible substrate can vary widely, but is typically in the range of from about 1:1 to about 1:1000, preferably from about 1:10 to about 1:50. The melted emulsifier can be spread over the edible substrate by various means, including vigorous mixing and/or spraying to provide the edible carrier. The divalent mineral salt is then combined with the edible carrier. The ratio of divalent mineral salt to edible carrier can vary widely, but is typically in the range of from about 1:1 to about 1:500, preferably from about 1:50 to about 1:250. The divalent mineral salt is thoroughly mixed with the edible carrier to insure that it is in intimate contact with the emulsifier.

C. Combinations of Nutritional Compositions with Other Minerals and Vitamins

The nutritional compositions of the present invention can also be combined with other minerals, as well as various vitamins, in nutritionally effective amounts. For these nutritional combinations with other minerals and vitamins, a "nutritionally effective amount" means the mineral or vitamin is included in amount that provides a measurable, nourishing amount of the mineral/vitamin. This typically is at least about 3%, more typically more than about 10%, preferably from about 20 to about 200% and, most preferably, from about 20 to about 100% of the RDA for the mineral/vitamin in the consumable product. Of course, it is recognized that the preferred daily intake of any mineral or vitamin can vary with the user. For these combinations of the present invention, the nutritionally effective amount for the mineral or vitamin will generally comprise more than about 3% of the RDA and preferably from about 10 to about 100% of the RDA, most preferably from about 10 to about 30% of the RDA, per unit portion of the consumable product.

A particularly desirable mineral to include in the nutritional combinations of the present invention is iodine. Suitable sources of iodine include potassium iodide and potassium iodate (plain or coated with coating materials such as calcium stearate). Preferably from about 10 to about 300% of the RDA iodine is included in the edible mix or beverage or other consumable product (from about 15 µg/240 gm of consumable product to about 450 µg/240 gm of the consumable product). Most preferably, the amount of iodine included is from about 25 to about 150% of the RDA.

A particularly desirable vitamin to include in the nutritional combinations of the present invention is vitamin A. Any commercially available source of vitamin A suitable for inclusion edible products can be used such as vitamin A palmitate, vitamin A acetate, β-carotene and the like. From about 10 to about 50% of the RDA of vitamin A is preferably added to the edible mix or beverage or other consumable product. The β-carotene can be encapsulated in dextrin, gum acacia, gelatin or similar encapsulation materials, for example, encapsulated β-carotene (1% or 10% powder) supplied by Roche Vitamins and Fine Chemicals, Nutley, N.J. A level of from about 0.0006% or about 1.5 mg/240 gm beverage or other consumable product provides at least about 25% of the RDA of vitamin A as β-carotene. Preferably, from about 0.00 to about 0.007% β-carotene (from 0 to about 300% of the RDA of vitamin A) and, most preferably, from about 0.018 to about 0.036% β-carotene (from about 75 to about 150% of the RDA of vitamin A) is used in the nutritional combination.

Another particularly desirable vitamin to include in the nutritional combinations of the present invention is vitamin C. Any commercially available source of vitamin C or ascorbic acid suitable for inclusion in edible products can be used. Encapsulated vitamin C and edible salts of ascorbic acid can also be used. Preferably from about 25 to about 300% of the RDA is included in the edible mix or beverage or other consumable product (from about 15 mg/240 gm of consumable product or about 0.006%, to about 180 mg/240 gm of the consumable product or about 0.075%). Most preferably, the amount of vitamin C is included from about 25 to about 150% of the RDA.

Another particularly desirable vitamin to include in the nutritional combinations of the present invention is riboflavin. Any commercially available source of riboflavin suitable for inclusion in edible products can be used. Preferably from about 20 to about 200% of the RDA of riboflavin is included in the nutritional combination (from about 0.34 mg/240 gm to about 3.4 mg/240 gm of the consumable product). Other vitamins that can be added to the nutritional combinations of the present invention include vitamin B1 (e.g., thiamine HCl), vitamin B6, vitamin B12, niacin, pantothenic acid, folic acid, vitamin D, and vitamin E.

These other minerals and vitamins can be added, mixed with or otherwise combined with the nutritional composition to form the nutritional combinations of the present invention by any suitable method. In the case of nutritional iron compositions, a key aspect of the present invention is to add these other minerals and vitamins after the ferrous salt is combined with the emulsifier-containing carrier. This has been found to prevent or minimize the development of undesirable gray color that can be caused by ferrous salts such as ferrous fumarate or ferrous succinate in chocolate flavored edible mixes. This also prevents or minimizes the undesired iron catalyzed oxidation of any vitamins that are present, as well as improving the retention of iodine.

D. Uses of Nutritional Compositions and Combinations

The nutritional compositions and combinations of the present invention are useful in fortifying a wide variety of food and beverage products, including baked goods and baked good mixes (e.g., bread, cakes, brownies, muffins, cookies, pastries, pies, pie crusts), other sweet snacks, icings, frostings, pie fillings, puddings, creams, hard and soft candies, chocolates, crackers, shortening and oil products (e.g., shortenings, margarines, frying oils, cooking and salad oils, popcorn oils, salad dressings, and mayonnaise), fried snacks derived from potatoes, corn, wheat and other grains (e.g., Pringle's potato chips, corn chips, tortilla chips), other fried farinaceous snack foods (e.g., french fries, doughnuts, fried chicken), dairy products and artificial dairy products (e.g., butter, ice cream and other fat-containing frozen desserts, yogurt, and cheeses, including natural cheeses, processed cheeses, cream cheese, cottage cheese, cheese foods and cheese spread, milk, cream, sour cream, butter milk, and coffee creamer), meat products (e.g., hamburgers, hot dogs, frankfurters, wieners, sausages, bologna and other luncheon meats, canned meats, including pasta/meat products, stews, sandwich spreads, canned fish), meat analogs, tofu, and various kinds of protein spreads, sweet goods and confections (e.g., candies, chocolates, chocolate confections, frostings and icings, syrups, cream fillings, and fruit fillings), nut butters (e.g., peanut butter), fruit/fruit-flavored juices and juice drinks (e.g., orange juice, apple juice, etc.), vegetable juice based beverages, and various kinds of soups, dips, sauces and gravies. The nutritional compositions and combinations of the present invention are especially useful in fortifying food and beverage products which comprise an effective amount of a beverage (fruit, chocolate), dairy (vanilla, cheese, butter), savory (beef, chicken), or bakery/confection flavor (cinnamon, mocha, peanut), as well as mixtures of these flavors. These food and beverage products can be in a variety of forms including reconstitutable edible mixes, ready-to-serve or ready-to-eat products, extenders, supplements and enhancers, etc. Other possible uses for the nutritional compositions and combinations of the present invention include vitamin and mineral supplements, lozenges, chewing gums, and cold syrups/drinks.

E. Iron Fortified Chocolate Flavored Edible Mixes

The nutritional iron compositions and combinations of the present invention are particularly useful in the preparation of iron fortified chocolate flavored edible mixes, especially chocolate flavored beverage mixes, as well as chocolate flavored ready to serve beverages. An important component of these iron fortified edible mixes and ready-to-serve beverages is cocoa. The cocoa used in the edible mixes and beverages of the present invention can be natural or "Dutched" chocolate, or washed or fermented cocoa, from which a substantial portion of the fat or cocoa butter has been expressed or removed by solvent extraction, by pressing, or by other means. Cocoa suitable for use in the present invention can contain from about 0.5 to about 20% fatty constituents. Dutched chocolate is prepared by treating cocoa nibs with alkaline material such as potassium carbonate in a manner well known in the art. Generally, it tends to have a darker color and also can be more flavorful than natural cocoas.

Fermented cocoa powder can also be used in edible mixes and ready-to-serve beverages of the present invention. This cocoa is prepared by fermenting green cocoa beans before roasting and milling. The fermentation is usually conducted by soaking the green beans in water for a week and then drying.

Chocolate can be used as the cocoa source for edible mixes and ready-to-serve beverages of the present invention and it is intended, therefore, that chocolate, as described above, be encompassed by the term "cocoa." When chocolate is used, it should be in a finely divided form. It can also be necessary to reduce the amount of fat in the chocolate for incorporation into the dry edible mix or ready-to-serve beverage so that the total fat does not exceed about 5%.

The cocoa should be heat treated to sterilize it. Any conventional pasteurization oven or pasteurization equipment for solids can be used to sterilize the cocoa. Heating the cocoa to about 110° C. for from about 1.5 to about 3 hours is usually sufficient to kill bacteria, yeasts and molds.

The cocoa is included in the edible mixes and ready-to-serve beverages of the present invention in a "flavor enhancing" amount. The particular amount of the cocoa effective for providing chocolate flavor characteristics for these edible mixes or beverages ("flavor enhancing") can depend upon the flavor impression desired and the type of cocoa used. Usually the cocoa comprises from about 0.05 to about 30%, preferably from about 2 to about 20%, most preferably from about 3.5 to about 16%, of the edible mix. In the case of ready-to-serve beverages, the cocoa comprises from about 0.005 to about 3.5%, preferably from about 0.02 to about 2.5%, most preferably from about 0.05 to about 2% of the beverage.

The edible mixes of the present invention can also contain dried milk solids. (In the case of ready-to-serve beverages of the present invention, dry milk solids can be used to prepare the beverage, especially where water is used instead of milk as the aqueous liquid.) While these edible mixes can be made without milk solids, the preferred level is up to about 25% of the mix. Most preferably the mix contains from about 0.5 to about 15% milk solids.

These milk solids can be prepared by drying milk to produce a mixture of the proteins, minerals, whey and other components of milk in a dry form. These solids are preferably non-fat milk solids, i.e., the solids derived from milk that has had the fat removed. Any commercial source of non-fat or other milk solids can be used. (The fat content of the milk solids is considered part of the total fat of the edible mix.)

Flow aids and other starches can be added to the milk solids to keep the powder from caking. Other desiccants can also be used. Protein supplements can be added to the milk solids to increase the protein content of the milk and the final edible mix.

Another component of the iron fortified edible mixes and ready-to-serve beverages of the present invention is a sweetener. As used herein the term "sweeteners" includes sugars, for example, glucose, sucrose, and fructose. These sugars also include high fructose corn syrup solids, invert sugar, sugar alcohols, including sorbitol, and mixtures thereof. The sweeteners typically included in the edible mixes of the present invention are monosaccharides and disaccharides. These include sucrose, fructose, dextrose, maltose and lactose. Other carbohydrate sweeteners can be used if less sweetness is desired. Mixtures of these sugars can also be used.

Suitable sweeteners for use in the edible mixes and ready-to-serve beverages of the present invention also include lower calorie sweeteners, either alone or combination with other caloric sweeteners such as sugars. Suitable lower calorie sweeteners include saccharin, cyclamates, acetosulfam, L-aspartyl-L-phenylalanine lower alkyl ester sweeteners (e.g., aspartame), L-aspartyl-D-alanine amides disclosed in U.S. Pat. No. 4,411,925 (Brennan et al), issued Oct. 23, 1983, L-aspartyl-D-serine amides sweeteners disclosed in U.S. Pat. No. 4,399,163 (Brennan et al), issued Aug. 16, 1983, L-aspartyl-L-1-hydroxymethylalkaneamide sweeteners disclosed in U.S. Pat. No. 4,338,346 (Brand), issued Dec. 21, 1982, L-aspartyl-1-hydroxyethylakaneamide sweeteners disclosed in U.S. Pat. No. 4,423,029 (Rizzi), issued Dec. 27, 1983, L-aspartyl-D-phenylglycine ester and amide sweeteners disclosed in U.S. Pat. No. 4,677,126 (Janusz et al), issued Jun. 30, 1987, and the like. A particularly preferred lower calorie sweetener is aspartame.

The amount of the sweetener effective (i.e., "effective amount") in the edible mixes and ready-to-serve beverages of the present invention depends upon the particular sweetener used and the sweetness intensity desired. For lower calorie sweeteners, this amount varies depending upon the sweetness intensity of the particular sweetener. For sugar (e.g., sucrose), this amount can be in the range of from about 10 to about 95%, typically from about 55 to about 70%, in the case of edible mixes and in the case of ready-to-serve beverages, typically from about 1 to about 15%. In determining the amount of sugar for the edible mixes and ready-to-serve beverages of the present invention, any sugar or other sweetener present in the flavor component (e.g., fruit juice) is also included. In general, the amount of sweetener included in the edible mixes of the present invention is in the range of from about 0.5% to about 95%, while the amount of sweetener included in the ready-to-serve beverages of the present invention is in the range of from about 0.05 to about 15%.

The iron fortified edible mixes and ready-to-serve beverages of the present invention can further comprise flavors other than cocoa. As used herein, the term "flavors" includes both fruit and botanical flavors other than cocoa.

The term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit; i.e., derived from bean, nuts, bark, roots and leaves. Also included within the term "botanical flavor" are synthetically prepared flavors made to simulate botanical flavors derived from natural sources. Examples of noncocoa botanical flavors are vanilla, coffee, cola, tea, and the like. Botanical flavors can be derived from natural sources such as essential oils and extracts, or can be synthetically prepared.

Flavors that complement chocolate flavor can be particularly suitable for inclusion in the edible mixes and ready-to-serve beverages of the present invention. These complementary flavors include mint, caramel, malt extract, coffee, toffee, creamy, cinnamon and nut flavors, as well as mixtures of these flavors. Other desirable flavors include vanilla, strawberry, cherry, pineapple, banana, as well as mixtures of these flavors.

These noncocoa flavors can be included the edibles mixes and ready-to-serve beverages of the present invention in a flavor enhancing amount. The particular amount of the flavor effective for providing positive flavor characteristics ("flavor enhancing") can depend upon the flavor(s) selected, the flavor impression desired, and the form of the flavor. Usually these noncocoa flavors comprise from 0 to about 40%, preferably from about 10 to about 30%, most preferably from about 15 to about 25%, of the edible mix. In the case of ready-to-serve beverages, these noncocoa flavors comprise from 0 to about 10%, preferably from about 1 to about 3%, most preferably from about 1.5 to about 2.5%, of the ready-to-serve beverage.

Other minor ingredients typically present in edible mixes and ready-to-serve beverages can also be included. These other ingredients include preservatives such as benzoic acid and salts thereof, sulfur dioxide, butylated hydroxyanisole, butylated hydroxytoluene, etc. Also, typically included are colors derived either from natural or synthetics sources. Salt, e.g., sodium chloride, and other flavor enhancers can be used to improve the flavor imparted by the edible mix or ready-to-serve beverage of the present invention.

Emulsifiers are also typically included in edible mixes and ready-to-serve beverages of the present invention to help disperse the milk solids and the cocoa in the water or milk that is used to prepare the ready-to-serve beverage, or the reconstituted consumable product in the case of edible mixes. Any food grade emulsifier suitable for inclusion in edible products can be used. Examples of suitable emulsifiers include mono and di-glycerides of long chain fatty acids, preferably saturated fatty acids, and most preferably, stearic and palmitic acid mono- and diglycerides. Propylene glycol esters are also useful in these edible mixes. Lecithin is an especially preferred emulsifier for use in the edible mixes and ready-to-serve beverages of the present invention.

The edible mixes of the present invention are typically formulated as a dry mix. In the case of dry beverage mixes, the mix is typically diluted by a factor of from about 3 to about 50 to make the reconstituted beverage that is consumed. Accordingly, this dilution factor needs to be considered when preparing the edible mix since it is more concentrated than the reconstituted consumable product. Any conventional equipment for handling and mixing powders can be used. Preferably, the equipment will be capable of breaking up lumps and thoroughly mixing the powders, such as a micropulverizer. The dry ingredients should be sifted if there are lumps that are not being broken up during the blending. When emulsifiers are included, these emulsifiers should be melted and blended with the other ingredients as a liquid. Preferably, the bilayer stabilizers, such as cholesterol, fats/oils, etc., and the oil soluble vitamins, such as vitamin A and E, are dissolved in the emulsifier that is then blended with the other edible mix ingredients.

Preparation of ready-to-serve beverages can be carried out in a similar manner to the preparation of beverage mixes, at least as it relates to the dry ingredients such as the cocoa powder, iron composition, milk solids, vitamins and other minerals, etc. The primary difference is the addition of an aqueous fluid, typically in an amount of from about 60 to about 98%, preferably from about 75 to about 95%, of the finished ready-to serve beverage product. Suitable aqueous fluids include water and milk. Suitable milk sources include whole milk, low fat milk, skim milk, milk fluids made by reconstituting milk powders with water and the like.

EXAMPLES

The following includes specific embodiments of iron fortified food and beverage products, and processes for preparing them, according to the present invention.

Example I

A chocolate powder mix is prepared from the following ingredients:

| Ingredient | Amount (percent) |
| --- | --- |
| Granular Sucrose | 67.27 |
| Non-fat Dry Milk | 15.00 |
| Sodium Chloride | 0.40 |
| Fermented Cocoa Powder, 14% fat | 16.00 |
| Colors | 0.07 |
| Butylated Hydroxytoluene (BHT) | 0.01 |
| Vitamin/Mineral Mixture* | 0.55 |
| Ferrous Fumarate | 0.06 |
| Artificial Chocolate Flavor | 0.30 |
| Lecithin | 0.30 |
| Stabilizer (Cholesterol) | 0.04 |

*Vitamins A, C, D & E, B-vitamins (B1, B2, B6, B12, folate and niacin), iodine, zinc.

The lecithin and stabilizer are melted and mixed together, and then mixed with the sugar. Ferrous fumarate is added to this lecithinated sugar and then mixed in thoroughly. The vitamin/mineral mixture is added to the ferrous fumarate-containing mixture and then mixed in thoroughly. The remaining ingredients (e.g., cocoa) are added and mixed in to provide a homogeneous mixture. A drinkable beverage can be prepared by adding 25 g. of this chocolate powder mix to 240 ml of milk and then stirring vigorously.

Example II

A chocolate powder mix is prepared from the following ingredients:

| Ingredient | Amount (percent) |
| --- | --- |
| Granular Sucrose | 49.97 |
| Creamer* | 19.05 |
| Sodium Chloride | 0.35 |
| Fermented Cocoa Powder, 14% fat* | 3.57 |
| Xanthan Gum and Carboxymethylcellulose | 0.48 |
| Butylated Hydroxytoluene (BHT) | 0.01 |
| Vitamin/Mineral Mixture** | 0.33 |
| Ferrous Fumarate | 0.04 |
| Stabilizer (cholesterol) | 0.02 |
| Non Cocoa Flavors | 26.00 |
| Lecithin | 0.18 |

*Contains components (e.g., cholesterol and fat) that function as bilayer stabilizers
**Same as Example I The chocolate beverage powder is prepared similar to Example I. A drinkable beverage is prepared by adding 42 g. of this powder to 240 ml of water and then stirring vigorously.

Example III

A ready-to-serve chocolate beverage is prepared from the following ingredients:

| Ingredient | Amount (percent) |
| --- | --- |
| Milk | 92.08 |
| Sugar | 3.99 |
| Cocoa | 1.68 |
| Non-fat Dry Milk | 1.58 |
| Vitamin/Mineral Mixture* | 0.55 |
| Ferrous Fumarate | 0.007 |
| Sodium Chloride | 0.04 |
| Butylated Hydroxytoluene (BHT) | 0.00003 |
| Flavor | 0.03 |
| Carageenan | 0.002 |
| Stabilizer (cholesterol) | 0.004 |
| Lecithin | 0.03 |

*Same as Example I

The dry ingredients (i.e., all except milk) are mixed together according to the procedure in Example I, i.e., lecithin and sugar, followed by ferrous fumarate, followed by vitamin/mineral mixture, followed by remaining dry ingredients. Milk is added and mixed in until the mixture is homogeneous. This homogeneous mixture is subjected to Ultra High Temperature (UHT) pasteurization, i.e., by heating to 135°–150° C. for 5 seconds and then aseptically packaged to provide the ready-to-serve beverage.

Example IV

A chicken flavored soup is prepared from the following ingredients:

| Ingredient | Amount (%) |
| --- | --- |
| Water | 98.08 |
| Sucrose | 1.23 |
| Vitamin/Mineral Mixture* | 0.056 |
| Ferrous Fumarate | 0.006 |
| Chicken Flavor** | 0.49 |
| Salt | 0.11 |
| Lecithin | 0.031 |

*Same as Example I
**Contains fat and cholesterol that can act as stabilizer for lecithin.

The dry ingredients (i.e., except water) are mixed together according to the procedure of Example I. Hot water is then added and mixed in the chickened flavored soup.

Example V

A cream of wheat type product is prepared from the following ingredients:

| Ingredient | Amount (%) |
| --- | --- |
| Cream of Wheat | 12.47 |
| Water | 87.31 |
| Vitamin/Mineral Mixture* | 0.09 |
| Ferrous Fumarate | 0.01 |
| Butter flavor** | 0.08 |
| Lecithin | 0.05 |

*Same as Example I
**Contains fat and cholesterol that can act as stabilizer for lecithin.

The dry ingredients (except cream of wheat) are mixed together according to the procedure of Example I and then added to the cream of wheat. Hot water is then added to this mixture and then mixed in to provide a consumable cream of wheat product.

Example VI

A fruit flavored drink mix powder is prepared from the following ingredients:

| Ingredient | Amount (%) |
| --- | --- |
| Sugar | 65.3 |
| Citric Acid | 16.4 |
| Sodium Citrate | 6.9 |
| Yellow Dye | 0.4 |
| Vitamin/Mineral Mixture* | 0.6 |
| Ferrous Fumarate | 0.06 |
| Powdered Cloud | 4.9 |
| Flavor | 4.5 |
| Lecithin | 0.3 |

*Same as Example I

The above ingredients are mixed together according to the procedure of Example I.

Example VII

An iron fortified orange juice product is prepared from the following ingredients:

| Ingredient | Amount (%) |
| --- | --- |
| Orange Juice | 98.41 |
| Sugar | 1.48 |
| Ferrous fumarate | 0.008 |

-continued

| Ingredient | Amount (%) |
|---|---|
| Vitamin/Mineral Mixture* | 0.07 |
| Lecithin | 0.04 |

*Same as Example I

The above dry ingredients are mixed together according to the procedure of Example I and then mixed into the orange juice to provide the resulting iron fortified product.

What is claimed is:

1. A method for preparing a nutritional iron composition, which comprises the steps of:
   (a) coating an edible substrate with an effective amount of an emulsifier capable of forming a bilayer structure to provide an edible carrier;
   (b) spreading a nutritionally effective amount of a ferrous salt of a dicarboxylic acid having no other polar functional group on the surface of the edible carrier to provide a nutritional iron composition; and
   (c) combining the nutritional iron composition with at least one other mineral or vitamin selected from the group consisting of iodine, vitamin A, vitamin C, riboflavin, vitamin B1, vitamin B6, vitamin B12, niacin, pantothenic acid, folic acid, vitamin D, and vitamin E.

2. The method of claim 1 wherein said ferrous salt is selected from the group consisting of ferrous fumarate, ferrous succinate, and mixtures thereof.

3. The method of claim 2 wherein the ferrous salt is in an amount sufficient to provided from about 10 to about 100% of the RDA of iron.

4. The method of claim 1 wherein the emulsifier is selected from the group consisting of phospholipids, phospholipid-containing compositions, glycoplipids, glycolipid-containing compositions, sorbitan esters of long chain saturated fatty acids, lactic acid esters of long chain saturated fatty acid monoglycerides, diacetyl tartaric acid esters of long chain saturated fatty acid monoglycerides, bile salts and bile acids selected from the group consisting of chenodeoxycholic acid derivatives and secondary deoxycholic acid derivatives, and mixtures thereof.

5. The method of claim 4 wherein the emulsifier is selected from the group consisting of lecithins, cephalins, and plasmalogens.

6. The method of claim 5 wherein the emulsifier is lecithin.

7. The method of claim 4 wherein the carrier further comprises a bilayer stabilizer selected from the group consisting of animal and plant sterols, triglycerides, monoglycerides, diglycerides, phenolics, sucrose esters of long chain fatty acids in a ratio of emulsifier to stabilizer of from about 1:200 to about 25:1.

8. The method of claim 4 wherein the edible substrate is selected from the group consisting of starches, cellulose, cellulose derivatives, malt, gelatin, sugars, sugar alcohols, milk solids, creamers, synthetic dairy products, fats, oils and mixtures thereof and wherein the ratio of emulsifier to edible substrate is from about 1:1 to about 1:1000.

9. The method of claim 8 wherein the edible substrate is selected from the group consisting of sugars and combinations of sugars with a creamer, fat or oil and wherein the ratio of emulsifier to edible substrate is from about 1:10 to about 1:50.

10. The method of claim 4 wherein the at least one other mineral or vitamin is selected from the group consisting of iodine and vitamin A.

* * * * *